E. E. THROP AND R. J. SUTTON.
HEADLIGHT TURNING DEVICE.
APPLICATION FILED NOV. 3, 1921.

1,432,642.

Patented Oct. 17, 1922.

2 SHEETS—SHEET 1.

Inventor
Erve E. Throp
Robert J. Sutton

By B. P. Milburn
Attorney

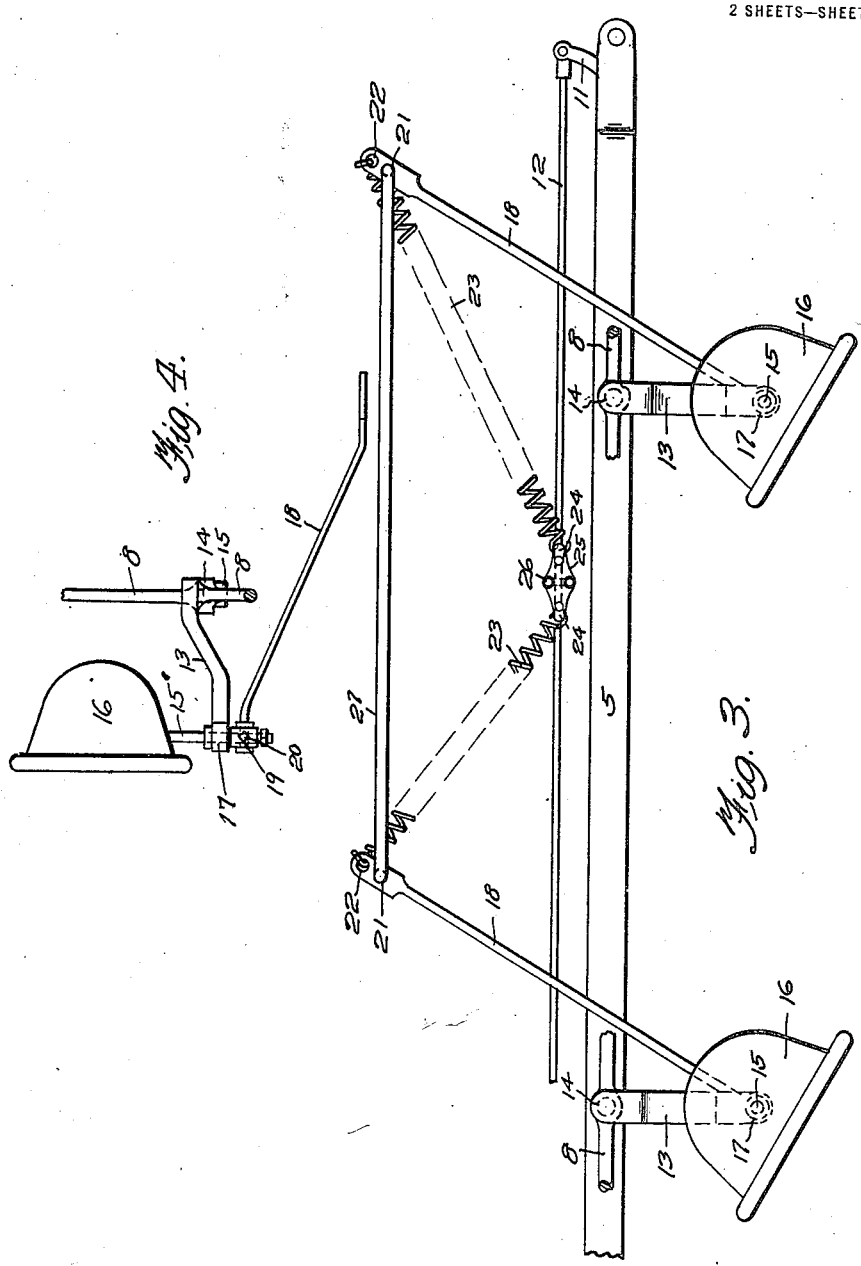

Patented Oct. 17, 1922.

1,432,642

UNITED STATES PATENT OFFICE.

ERVE E. THROP AND ROBERT J. SUTTON, OF ANGOLA, INDIANA, ASSIGNORS, BY DIRECT AND MESNE ASSIGNMENTS, OF ONE-HALF TO GEORGE H. EVERETT AND ONE-HALF TO MORGAN R. KAVANAGH, BOTH OF SOUTH BEND, INDIANA.

HEADLIGHT-TURNING DEVICE.

Application filed November 3, 1921. Serial No. 512,604.

*To all whom it may concern:*

Be it known that we, ERVE E. THROP and ROBERT J. SUTTON, citizens of the United States, residing at Angola, in the county of Steuben and State of Indiana, have invented certain new and useful Improvements in Headlight-Turning Devices, of which the following is a specification.

Our invention relates to apparatus for turning the head lamps of an automobile, in the direction in which the front wheels are steered.

An important object of the invention is to provide apparatus, in the nature of an attachment, whereby the head lamps of the Ford automobile may be pivotally supported and so connected with a movable part of the steering means for the front wheels, that the lamps are turned in unison with the front wheels in steering.

A further object of the invention is to provide means whereby the steering of the front wheels will not be interferred with, in the event that the head lamps should become stuck or incapable of turning.

A further object of the invention is to provide means whereby the head lamps may be pivotally supported and turned in unison with the steering of the front wheels, such means being so arranged that the same does not interfere with the employment of the usual shock absorbers.

A further object of the invention is to provide apparatus of the above mentioned character, which is simple in construction, strong and durable.

Other objects and advantages of the invention will be apparent during the course of the following description.

Figure 1:
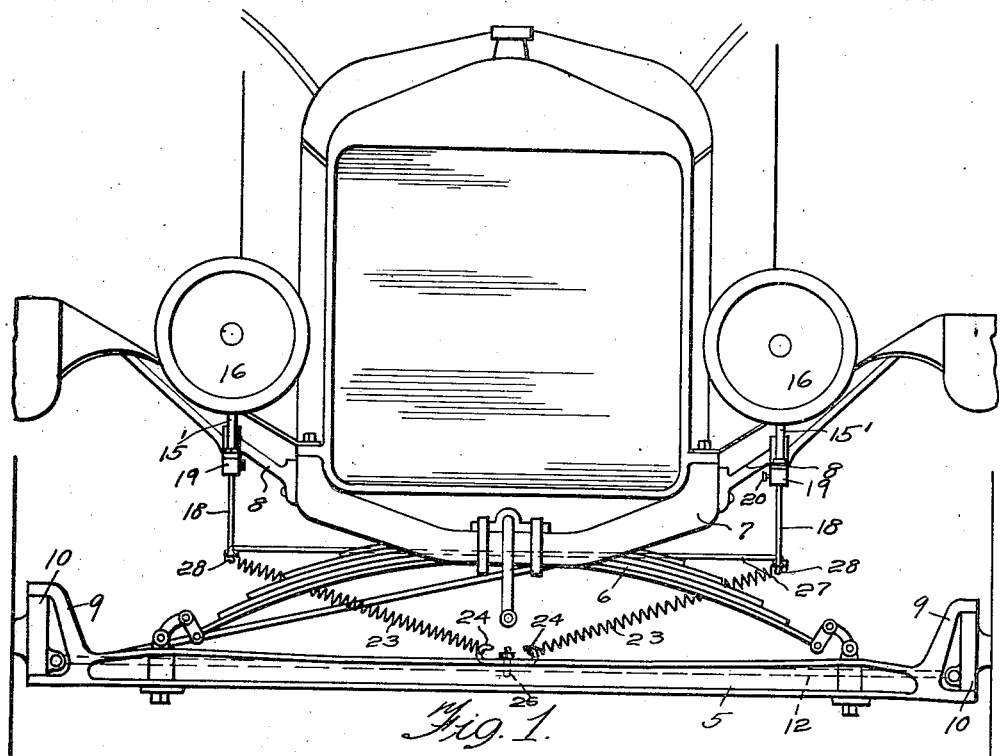
Figure 2:
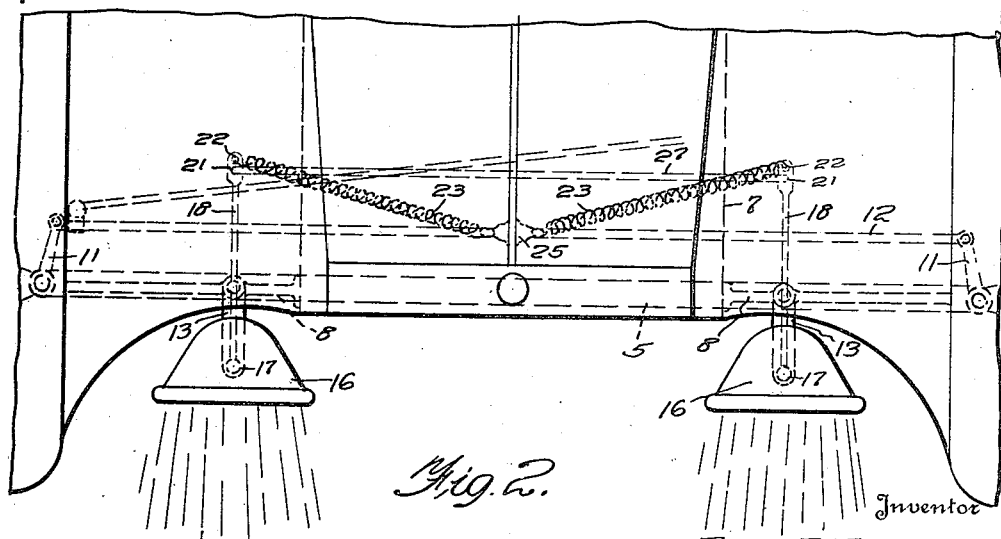

In the accompanying drawings forming a part of this specification, and in which like numerals are employed to designate like parts throughout the same, Fig. 1 is a side elevation of apparatus embodying my invention, showing the same in use, Fig. 2 is a plan view of the same, Fig. 3 is a plan view of the apparatus, portions of the car being omitted, and the lamps shown turned in one direction, and, Fig. 4 is a side elevation of my extension bracket.

In the drawings, wherein for the purpose of illustration is shown a preferred embodiment of my invention, the numeral 5 designates the front axle of a Ford automobile, carrying the front spring 6, supporting the frame or chassis 7. The numeral 8 designates the usual lamp brackets. The numeral 9 designates the forked ends of the axle 5, pivotally receiving therein the knuckles 10 of the front wheels. Steering mechanism for the knuckles 10 embodies the cranks 11, pivotally connected by a drag link 12.

In accordance with our invention, we provide an extension bracket 13, provided at its rear end with a depending bolt 14, screw threaded for receiving a nut 15. The stem 15' of the head lamp 16 is removed from the usual opening in the bracket 8, and the bolt 14 is passed downwardly through this opening and clamped therein by screwing up the nut 15. The stem 15' is then inserted in the opening 17 in the forward end of the extension bracket 13, and is pivoted therein. By this means, the head lamps are brought forwardly a substantial distance, and hence out of the way of shock absorbers or the like, notwithstanding the fact that the lamps are lowered.

We provide rearwardly extending inclined arms 18, the forward ends of which are provided with sleeves 19, integral therewith. These sleeves fit upon the lower end of the stems 15', and may be clamped thereto by bolts 20 or the like. The arms 18 extend rearwardly beneath the front fenders of the automobile, and each arm is provided with a pair of apertures 21 and 22. The forward apertures 21 receive the ends of retractile coil springs 23, the forward ends of which are secured to hooks 24, formed upon a bracket 25. The bracket 25 is clamped to the drag link 12 by a U-bolt 26 or the like. A relatively rigid link or rod 27 has its ends bent into transverse or hooked portions 28, which are pivoted in the apertures 22. Particular attention is called to the fact that the arms 18, connecting the link or rod 27 and springs 23 are all arranged rearwardly of the spring 6 of the automobile, and the link 27 and springs operate beneath the crank case of the engine. These elements are therefore arranged in an out of the way position and are protected.

In the use of the apparatus, as the drag link 12 is moved longitudinally in either direction, for steering the front wheels of the automobile, such longitudinal movement will be transmitted to the retractile coil springs, and one spring will accordingly shift the link 27 longitudinally, and turn the lamps in the proper direction. Should the lamps bind or become incapable of turning, the retractile coil spring will yield, and hence the steering of the machine will not be interfered with.

It is to be understood that the form of our invention herewith shown and described, is to be taken as a preferred example of the same, and that various changes in the shape, size, and arrangement of parts may be resorted to without departing from the spirit of my invention, or the scope of the subjoined claims.

Having thus described our invention, we claim:

1. The combination with the apertured lamp brackets of an automobile carried by the forward end of the same, of extension brackets arranged near the lamp brackets and projecting forwardly therebeyond, said extension brackets having rear horizontal portions and forward horizontal portions which are connected by intermediate inclined portions extending downwardly toward said forward horizontal portions, said forward horizontal portions having vertical openings formed therein, bolts carried by the rear horizontal portions and clamped within the apertured lamp brackets, vertical stems pivotally mounted within the vertical openings in said forward horizontal portions, lamps carried by said vertical stems, arms provided at their forward ends with sleeves secured to the lower ends of said stems, said arms extending rearwardly and downwardly and terminating rearwardly of the front springs of the automobile, each arm being provided at its rear end with a pair of apertures, a link having its ends engaging within one set of apertures and arranged wholly rearwardly of the front springs, retractile coil springs connected in the other set of apertures of said arms, and a clamp secured to the drag link of the steering mechanism and connected with the opposite ends of said retractile coil springs, said retractile coil springs, connecting rod, and the rear portions of said arms being arranged wholly rearwardly of the front spring of the automobile.

2. The combination with the apertured lamp brackets of an automobile carried by the forward end of the same, of extension brackets arranged near the lamp brackets and projecting forwardly therebeyond, said extension brackets being provided near their forward ends with substantially vertical openings, bolts carried by the rear horizontal portions of said extension brackets and clamped within the apertured lamp brackets, vertical stems pivotally mounted within the vertical openings in the forward ends of said extension brackets, lamps carried by said vertical stems, arms having their forward ends clamped to the lower ends of said stems, said arms extending rearwardly and downwardly and terminating rearwardly of the front springs of the automobile, a link pivotally connected with the rear ends of the arms and arranged wholly rearwardly of the front springs, retractile coil springs connected with the rear ends of said arms, and a clamp secured to the drag link of the steering mechanism and connected with the opposite ends of said retractile coil springs, said retractile coil springs, connecting rod, and rear portions of said arms being arranged wholly rearwardly of the front spring of the automobile.

In testimony whereof we affix our signatures.

ERVE E. THROP.
ROBERT J. SUTTON.